US010310529B1

(12) United States Patent
Cai

(10) Patent No.: US 10,310,529 B1
(45) Date of Patent: Jun. 4, 2019

(54) LINEAR VOLTAGE REGULATOR FOR LOW-POWER DIGITAL CIRCUIT OF CHIP

(71) Applicant: Aplus Microstructure Electronics Co., Ltd, Changzhou, Jiangsu (CN)

(72) Inventor: Shuihe Cai, Jiangsu (CN)

(73) Assignee: Aplus Microstructure Electronics Co., Ltd., Changzhou (CN)

( * ) Notice: Subject to any disclaimer, the term of this patent is extended or adjusted under 35 U.S.C. 154(b) by 0 days.

(21) Appl. No.: 15/950,912

(22) Filed: Apr. 11, 2018

(30) Foreign Application Priority Data

Nov. 13, 2017 (CN) .......................... 2017 1 1112583

(51) Int. Cl.
*G06F 1/20* (2006.01)
*G05F 1/575* (2006.01)
*G05F 1/569* (2006.01)
*G05F 1/46* (2006.01)

(52) U.S. Cl.
CPC .............. *G05F 1/575* (2013.01); *G05F 1/569* (2013.01); *G05F 1/461* (2013.01)

(58) Field of Classification Search
CPC ................................. G05F 1/461; G05F 1/575
USPC .......................................... 323/281–289, 315
See application file for complete search history.

(56) References Cited

U.S. PATENT DOCUMENTS 5,786,685 A * 7/1998 Lange ....................... H02J 9/06 307/66
6,040,717 A * 3/2000 Fried .................. H03K 19/1737 326/112
6,205,070 B1 * 3/2001 Seevinck ............... G11C 7/062 365/205
6,639,815 B1 * 10/2003 Gucyski ................ H02M 1/088 363/40
7,265,499 B2 * 9/2007 Ball ................... H05B 33/0815 315/209 R (Continued)

*Primary Examiner* — Fred E Finch, III
*Assistant Examiner* — Nusrat Quddus
(74) *Attorney, Agent, or Firm* — Wayne & Ken, LLC; Tony Hom

(57) ABSTRACT

The present invention relates to a linear voltage regulator for a low-power digital circuit of a chip, comprising a reference voltage varying with a threshold voltage, a buffer formed by amplifiers, and a compensation capacitor. The reference voltage is used as an input end of the buffer, an output voltage of the buffer, having a current driving capability, is kept consistent with the reference voltage, and the compensation capacitor is configured to decrease the fluctuation range of the output voltage when a current load varies. The reference voltage comprises two gate-source voltages of an MOS operating in a sub-threshold region, and the reference voltage $V_{ref}$ satisfies the following relation:

$$V_{ref} \propto \beta(|V_{GS1}|+V_{GS2});$$

the reference voltage $V_{ref}$ flows through the output buffer formed by the amplifiers to supply a voltage to a digital circuit. By adopting a reference related to the threshold voltage of the MOS, the reference voltage will also vary with the changes in the process conditions and ambient temperature, so that an output of a linear voltage regulator can reflect such changes in the conditions, thereby reducing the operating supply voltage of the digital circuit and greatly reducing the power consumption accordingly.

1 Claim, 4 Drawing Sheets

(56) References Cited

U.S. PATENT DOCUMENTS

| | | | | |
|---|---|---|---|---|
| 7,957,847 | B2 * | 6/2011 | Donaldson | H02M 3/156 323/224 |
| 8,786,265 | B2 * | 7/2014 | Manlove | H02M 3/157 323/282 |
| 9,941,716 | B2 * | 4/2018 | Yoshimatsu | H02J 7/0031 |
| 2008/0074413 | A1 * | 3/2008 | Ogura | G09G 3/3233 345/212 |
| 2009/0316454 | A1 * | 12/2009 | Colbeck | H02M 1/4225 363/89 |
| 2010/0109730 | A1 * | 5/2010 | Zhang | H02M 3/156 327/175 |
| 2017/0153135 | A1 * | 6/2017 | Li | G01F 1/584 |
| 2017/0155315 | A1 * | 6/2017 | Yasusaka | G05F 1/468 |

* cited by examiner

LINEAR VOLTAGE REGULATOR FOR LOW-POWER DIGITAL CIRCUIT OF CHIP

TECHNICAL FIELD

The present invention relates to the technical field of voltage regulation, and in particular to a linear voltage regulator for a low-power digital circuit of a chip.

BACKGROUND OF THE PRESENT INVENTION

In today's designs of a chip, multiple voltage domains are usually required, and the voltages of digital circuits, analog circuits and external interface circuits are all different. An effective way to supply power to these circuits is a linear voltage regulator. At present, a universal linear voltage regulator, as shown in FIG. 1 of Patent CN106200741A entitled Current Sink Load Circuit and Low-Dropout Linear Voltage Regulator, consists of a bandgap reference source, an error amplifier, a power transistor and a sampling circuit. An important characteristic of voltage regulators of this type is to maintain the stability of an output voltage under various conditions. The bandgap reference source used for a reference voltage ensures a very little change in the reference voltage under various conditions, so that the voltage of the linear voltage regulator remains stable. In practical applications, if a threshold voltage of an MOS transistor is reduced at high temperature, the actual operating power required by a circuit can be reduced. However, a leakage current of the chip increases because of the constant output of the voltage regulator.

The power consumption of a digital circuit consists of dynamic power consumption, short-circuit current and static leakage current of a circuit switch, and an effective way to reduce such three kinds of current is to reduce a supply voltage. In conventional linear voltage regulator circuits, a minimum operating voltage required in the worst case is set as a threshold voltage so as to ensure that the chip can operate under various process conditions, thus resulting in high supply voltage and increased power consumption of the digital circuit.

Therefore, great improvements to the existing technology are urgently needed.

SUMMARY OF THE PRESENT INVENTION

To overcome the above disadvantages of the prior art, a technical problem to be solved by the present invention is to provide a linear voltage regulator for a low-power digital circuit of a chip, including a reference voltage varying with a threshold voltage, a buffer formed by amplifiers, and a compensation capacitor, wherein the reference voltage is used as an input end of the buffer, an output voltage of the buffer, having a current driving capability, is kept consistent with the reference voltage, and the compensation capacitor is configured to decrease the fluctuation range of the output voltage when a current load varies; the reference voltage includes two gate-source voltages of an MOS operating in a sub-threshold region, and the reference voltage $V_{ref}$ satisfies the following relation:

$$V_{ref} \propto \beta(|V_{GS1}|+V_{GS2});$$

and the reference voltage $V_{ref}$ flows through the output buffer formed by the amplifiers to supply a voltage to a digital circuit.

The linear voltage regulator for a low-power digital circuit of a chip according to the present invention has the flowing beneficial effects: by adopting a reference related to the threshold voltage of the MOS, the reference voltage will also vary with the changes in the process conditions and ambient temperature, so that an output of a linear voltage regulator can reflect such changes in the conditions, thereby reducing the operating supply voltage of the digital circuit and greatly reducing the power consumption accordingly.

BRIEF DESCRIPTION OF THE DRAWINGS

The present invention will be further described as below with reference to the accompanying drawings by embodiments. In the drawings.

DETAILED DESCRIPTION OF THE PRESENT INVENTION

Figure 1:
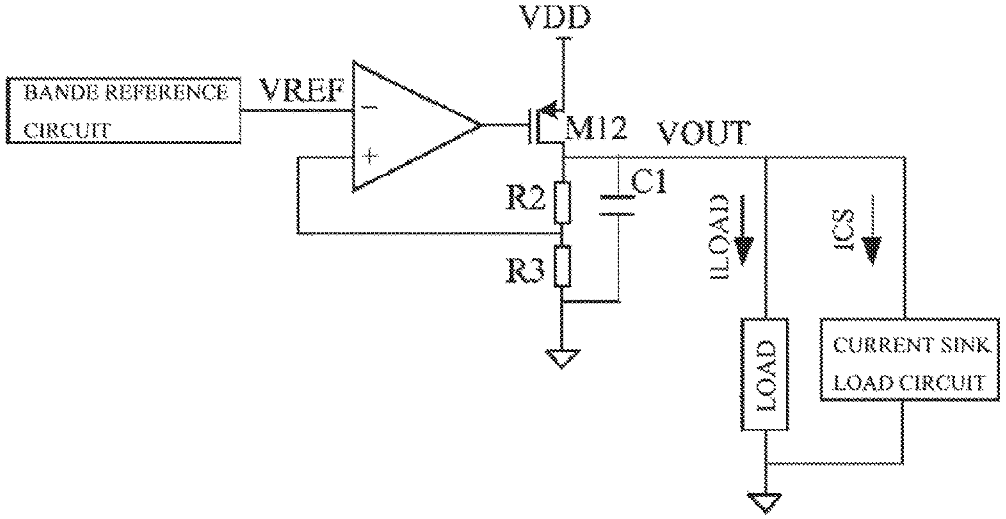
FIG. 1 (Prior Art)
FIG. 1 is a schematic circuit diagram of a conventional linear voltage regulator.

With reference to FIG. 1, FIG. 1 is a schematic circuit diagram of a conventional linear voltage regulator. Taking a 40 nm CMOS process as an example, a standard voltage of a key device is 1.1V according to the design of the conventional linear voltage regulator.

Figure 2:
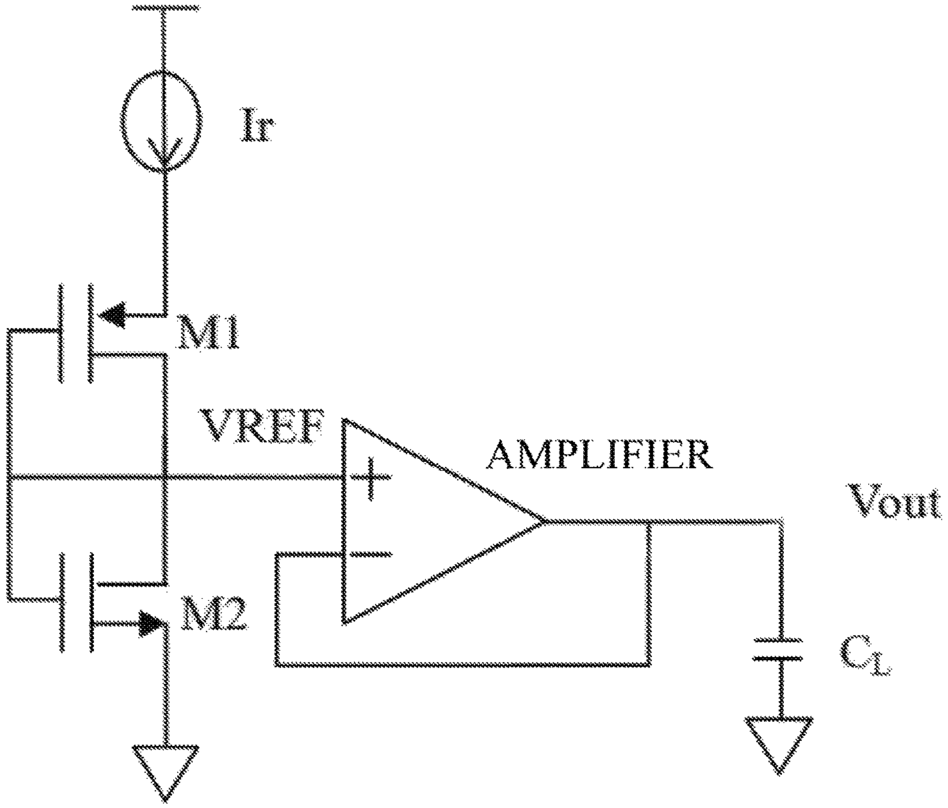
FIG. 2 is a schematic circuit diagram of a linear voltage regulator for a low-power digital circuit of a chip according to the present invention.

With reference to FIG. 2, FIG. 2 is a schematic module diagram of a first embodiment of a linear voltage regulator for a low-power digital circuit of a chip according to the present invention. As shown in FIG. 2, the linear voltage regulator for a low-power digital circuit of a chip according to the first embodiment of the present invention at least includes a reference voltage varying with a threshold voltage, a buffer formed by amplifiers, and a compensation capacitor. The reference voltage consists of two gate-source voltages $V_{GS}$ of an MOS operating in a sub-threshold region. The reference voltage $V_{ref}$ satisfies the following relation:

$$V_{ref} \propto \beta(|V_{GS1}|+V_{GS2}),$$

where $V_{GS1}$ is a first gate-source voltage of the MOS operating in the sub-threshold region, and $V_{GS2}$ is a second gate-source voltage of the MOS operating in the sub-threshold region. The reference voltage $V_{ref}$ flows through the output buffer formed by the amplifiers to supply a voltage to a digital circuit. Therefore, an output voltage $V_{out}$ of the linear voltage regulator also varies with the threshold voltage.

Taking the 40 nm CMOS process as an example, the standard voltage of the key device is 1.1V. A supply voltage which is lower than the reference voltage is used to reduce the power consumption of the digital circuit as low as possible. When a process angle is at SS and the temperature is −40° C., the maximum output voltage $V_{out}$ in the present invention is 1.05V.

In case of any changes in the process angle and temperature, such as FF [fast fast] and 125° C., the conventional linear voltage regulator is still designed to be 1.1V. Because the present invention tracks the changes in the threshold voltage, its output voltage is 0.62V which is significantly lower than that of the conventional structure. The comparison and simulation is carried out by 1000 phase inverters.

Figure 3:
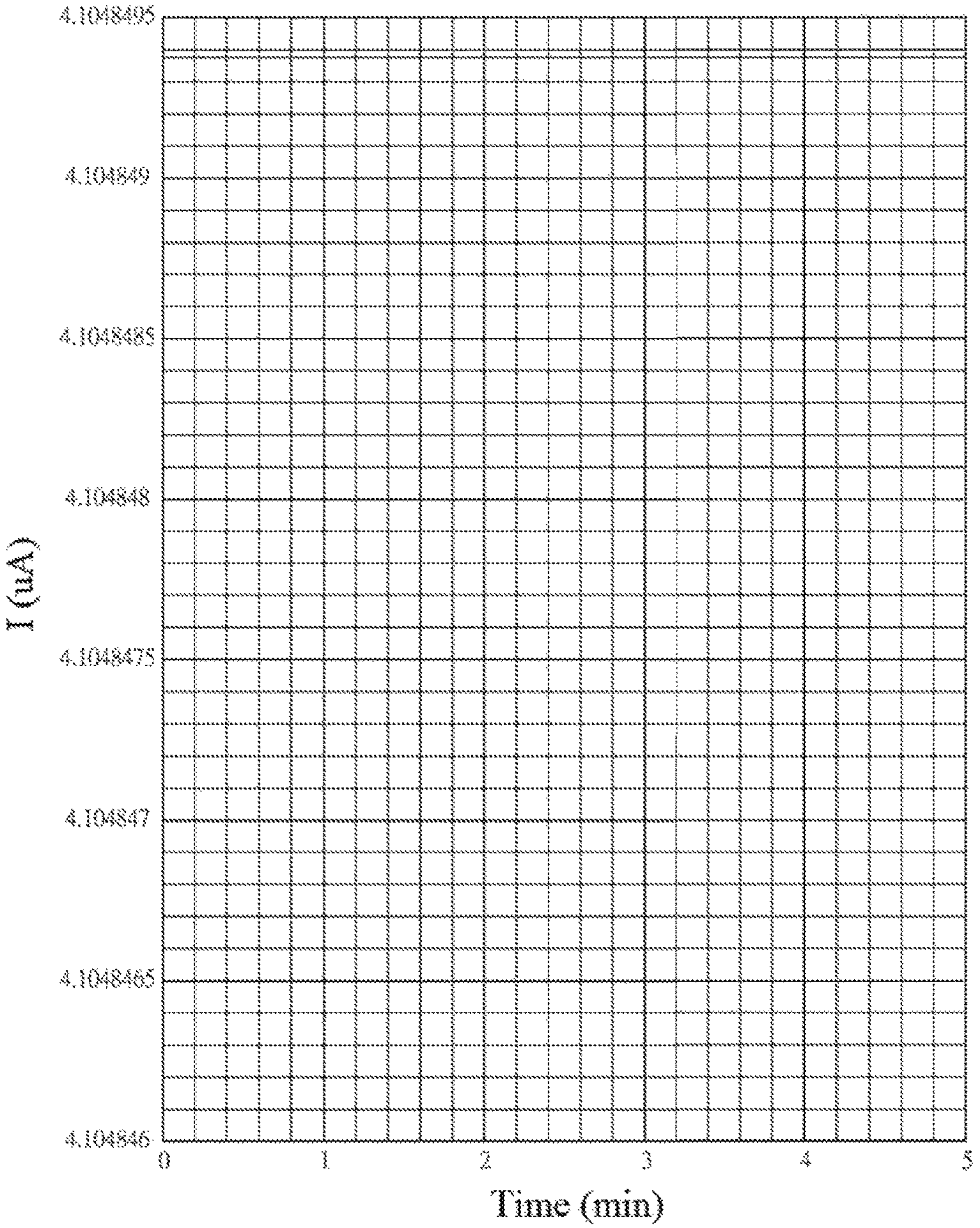
FIG. 3 shows leakage current of a digital circuit at 125° C. using the conventional linear voltage regulator.
Figure 4:
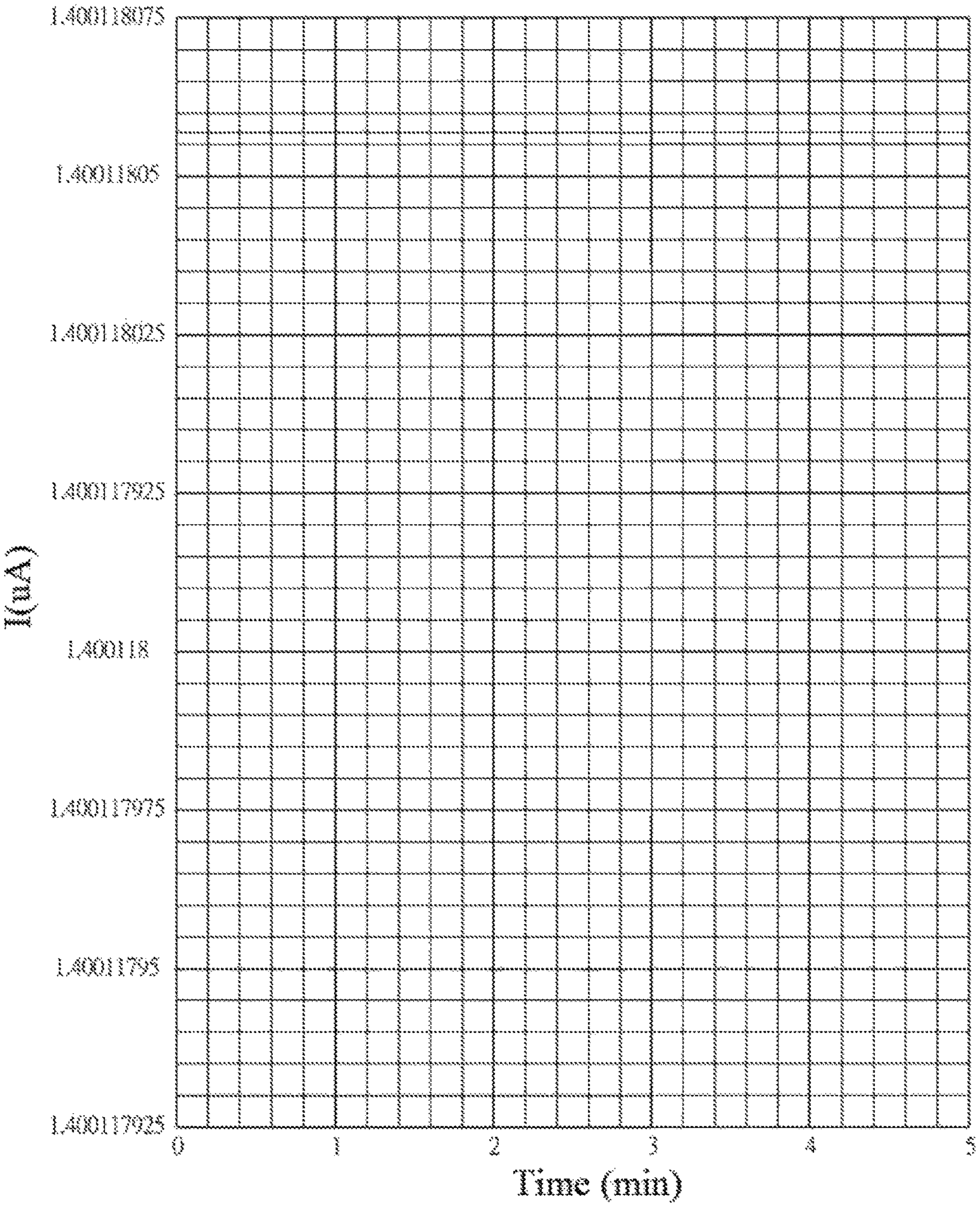
FIG. 4 shows leakage current of a digital circuit at 125° C. using the linear voltage regulator according to the present invention.

FIG. 3 shows leakage current of a digital circuit at 125° C. using the conventional linear voltage regulator. FIG. 4 shows leakage current of a digital circuit at 125° C. using the linear voltage regulator according to the present invention. As can be known, the leakage current of the circuit in the present invention is only ⅓ of that of the conventional structure, and the leakage current of the digital circuit can be significantly reduced by using the voltage regulator according to the present invention.

The dynamic power consumption of the digital circuit is directly proportional to the square of the supply voltage. The conventional linear voltage regulator outputs a constant voltage which must satisfy the voltage in the worst case, and the dynamic power consumption is relatively stable. The voltage output of the voltage regulator according to the present invention varies dynamically. Except that it is consistent with the conventional structure in the worst case, the dynamic power consumptions in other cases are all relatively low.

The present invention can achieve that the reference voltage will also vary with the changes in the process conditions and ambient temperature by using a reference related to the threshold voltage of the MOS, so that an output of a linear voltage regulator can reflect such changes in the conditions, thereby reducing the operating supply voltage of the digital circuit and greatly reducing the power consumption accordingly.

In order to reduce the leakage current of an MOS transistor, the supply voltage needs to be dynamically adjusted in accordance with changes in the operating environment, so that a reference voltage that varies with the threshold voltage is used. As the reference voltage varies with the threshold voltage, it can ensure that the supply voltage is reduced as low as possible when the digital circuit is working normally, to reduce the leakage current of the MOS transistor.

With the design in the above embodiments, the present invention can achieve that the reference voltage will also vary with the changes in the process conditions and ambient temperature by using a reference related to the threshold voltage of the MOS, so that an output of a linear voltage regulator can reflect such changes in the conditions, thereby reducing the operating supply voltage of the digital circuit and greatly reducing the power consumption accordingly.

The present invention has been described by specific embodiments, but it will be appreciated by a person of ordinary skill in the art that variations and equivalent substitutions may be made without departing from the scope of the present invention. In addition, various modifications may be made to the present invention to adapt to the specific situations of the present invention without departing from its protection scope. Therefore, the present invention is not limited to the specific embodiments disclosed herein, but includes all embodiments that fall into the scope of the claims.

What is claimed is:

1. A linear voltage regulator for a low-power digital circuit of a chip, comprising:

a first metal oxide semiconductor (MOS);

a second metal oxide semiconductor (MOS);

an output buffer formed by at least one amplifier; and a compensation capacitor;

wherein the first MOS is a PMOS and the second MOS is an NMOS and an input currency is connected to a source of the first MOS; a reference voltage ($V_{ref}$) outputted from the first MOS the second MOS is used as an input positive end of the buffer; an output voltage of the buffer, having a current driving capability, is kept consistent with the reference voltage, and the compensation capacitor is configured to decrease the fluctuation range of the output voltage when a current load varies; a value of the $V_{ref}$ satisfies the following relation:

$$V_{ref} \propto \beta(|V_{GS1}|+V_{GS2});$$

wherein $V_{GS1}$ is a gate-source voltage of the first MOS operating in the sub-threshold region, and $V_{GS2}$ is a second gate-source voltage of the MOS operating in the sub-threshold region; the reference voltage ($V_{ref}$) flows through the output buffer formed by the at least one amplifier to supply a voltage to a digital circuit.

* * * * *